United States Patent [19]

Willner et al.

[11] 3,927,829
[45] Dec. 23, 1975

[54] THERMOSTATIC EXPANSION VALVE
[75] Inventors: Richard Willner, St. Louis; Jude A. Pauli, Florissant; Frank A. Latuda, Maryland Heights, all of Mo.
[73] Assignee: Emerson Electric Co., St. Louis, Mo.
[22] Filed: July 5, 1974
[21] Appl. No.: 486,197

[52] U.S. Cl. ............................ 236/92 B; 62/225
[51] Int. Cl.² ........................................ G05D 27/00
[58] Field of Search ...................... 62/225; 236/92 B

[56] References Cited
UNITED STATES PATENTS
3,054,273  9/1962  McGrath .......................... 62/225 X
3,478,774  11/1969  Noakes et al. ................... 62/225 X Primary Examiner—William F. O'Dea
Assistant Examiner—Ronald C. Capossela
Attorney, Agent, or Firm—Polster and Polster

[57] ABSTRACT

A thermostatic expansion valve is provided with a tamper proof design which prevents variation of the valve setting from a preset condition. The preferred embodiment of the valve includes a valve body having inlet and outlet ports interconnected by an expansion port. A cavity is formed in the valve body which is axially aligned with the expansion port. A diaphragm actuated valve is hermetically sealed to the valve body. The diaphragm actuated valve includes a nonadjustable biasing spring enclosed in the cavity defined by the valve body on a first side of a flexible diaphragm. The spring is adapted to exert a force tending to close the expansion port of the valve. A pressure developing temperature sensing means is operatively connected to a second side of the flexible diaphragm. The temperature sensing means is precharged during valve construction to overcome the spring bias. Since the valve is hermetically sealed to the valve body, no other adjustment to the spring is necessary or can be made. A method for constructing an expansion valve is disclosed which eliminates the need for providing a separate adjustment for the spring of a diaphragm actuated expansion valve.

13 Claims, 2 Drawing Figures

THERMOSTATIC EXPANSION VALVE

BACKGROUND OF THE INVENTION

This invention relates to expansion valve commonly utilized in refrigeration systems.

In general, refrigeration systems include an evaporator, a compressor and a condensor. Refrigerant vapors drawn from the evaporator by the compressor are forced into the condensor, where the vapor liquifies. The liquid refrigerant then is returned to the evaporator through an expansion valve. The expansion valve converts the refrigerant from a high pressure liquid to a low pressure gas, by passing the refrigerant through a restriction in the valve. Control of refrigerant input to the evaporator can be maintained by inserting a valve member in the restriction of the expansion valve and adjusting the valve member in response to particular sensed conditions.

Prior art expansion valves commonly utilize a diaphragm responsive valve for modulating the refrigerant passing through the restriction. These valves conventionally include a diaphragm actuated valve member. A spring is biased between the valve and the diaphragm and is adapted to close the restriction when certain conditions are sensed. The opposite side of the diaphragm is operatively connected to a temperature sensing pressure generating means. Means for sensing output pressure of the evaporator also may be connected to the spring side of the diaphragm where pressure drop through the evaporator is relatively high.

The temperature sensing means utilized commonly is a bulb type sensor placed at the output side of the evaporator. The bulb of the sensor conventionally is charged with a gas. The gas expands as temperature increases, thereby raising the pressure on one side of the diaphragm, moving the diaphragm in a direction so as to open the expansion port.

In manufacturing prior art expansion valves, it is conventional to provide means for adjusting the spring force of the valve. This adjustment was believed necessary for a number of reasons. For example, the valve parts are assembled and the temperature sensing means is charged to a preset pressure. Theoretically, this pressure should be sufficient to overcome or balance the spring force acting on the diaphragm. Whether because of manufacturing tolerances, variations in spring construction, variations in the charge pressure, or combinations of these or other factors, in practice the spring force has been adjusted after charge to set the operating point of the valve.

While these prior art devices work well for their intended purposes, the mere fact that adjustment means are necessary increases the manufacturing cost of the valve as reflected in both time and material. In addition, the adjustment means is exposed to field maintenance personnel. Since the expansion valve is intended to operate at a preselected position determined by the design of the refrigeration system, readjustment of the valve by field personnel often adversely affects system performance.

The valve described hereinafter eliminates these prior art deficiencies by enclosing the spring within the valve body, and eliminating any adjustment means for the spring. This provides an extremely simple and low cost valve design. The operating point for the valve is determined during the charging of the temperature sensor. That is, the pressure of the gas contained in the sensor is varied to achieve the desired preset valve condition.

One of the objects of this invention is to provide a tamper proof expansion valve.

Another object of this invention is to provide a low cost expansion valve design.

Yet another object of this invention is to provide a valve design in which a preset initial condition of the valve is obtained by varying the charge pressure of an associated temperature sensor.

Other objects of this invention will be apparent to those skilled in the art in light of the following description and accompanying drawings.

SUMMARY OF THE INVENTION

In accordance with this invention, generally stated, a tamper proof thermostatic expansion valve is provided which includes a valve body having inlet, outlet and expansion ports formed in it. A cavity in the valve body is aligned axially with the expansion port. A diaphragm actuated valve includes a valve stem and biasing means positioned on a first side of a flexible diaphragm, and pressure varying temperature sensing means operatively connected to a second side of the flexible diaphragm. The diaphragm biasing means preferably is a coil compression spring completely enclosed by the valve structure, the spring being nonadjustable after final valve assembly. A method for thermostatic expansion valve construction varies the charge pressure of temperature sensing element to set the operating point of the expansion valve.

DESCRIPTION OF THE PREFERRED EMBODIMENT

Figure 2:
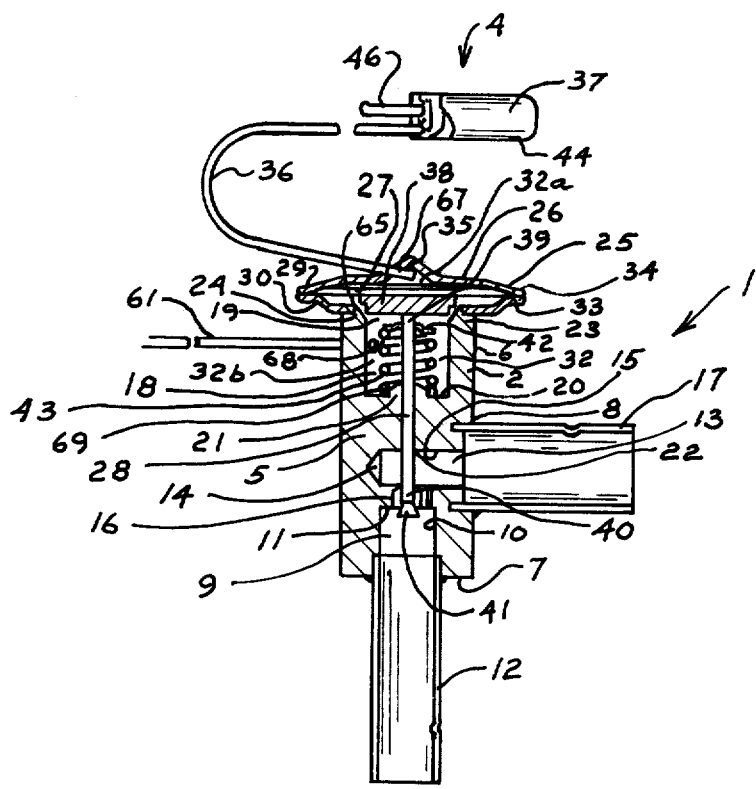
FIG. 2 is a sectional view, partly broken away, showing one illustrative embodiment of thermostatic expansion valve of this invention.

Referring now to the drawings, and more particularly to FIG. 2, reference numeral 1 indicates one illustrative embodiment of thermostatic expansion valve of this invention. The valve 1 includes a valve body 2, a diaphragm valve assembly 25, and means 4 for sensing a remote temperature.

Valve body 2, in the embodiment illustrated, comprises a solid cylindrical section 5 having a first end 6, a second end 7, and a side wall 8. The end 7 has an inlet port 9 formed in it. Port 9 is defined in part by a side wall 10 and a bottom wall 11. The port 9 may be counter sunk at its end 7 mouth to aid in attachment of an inlet connector 12. Other connection methods may be used, if desired.

Inlet connector 12 commonly is copper tubing which is welded or brazed to the valve body 2, after insertion of the connector 12 in the port 9. Various other tubing materials or other connector structures are compatible with the broader aspects of our invention.

Side wall 8 has an outlet port 13 formed in it. Outlet port 13 is defined in part by a closed bottom 14 and a side wall 15. The ports 9 and 13 are symmetrical about respective, intersecting perpendicular axes and overlap one another within the body 2 of the valve 1, as best seen in FIG. 2. A connector 17 is attached to the valve body 2 along the port 13. As with the connector 12-port 9 construction, the port 13 may be counter sunk at its side wall 8 mouth to provide an attachment area for the connector. Connector 17 is similar to the connector 12, and preferably is welded or brazed to the valve body 2.

An expansion port 16 extends between the inlet port 9 and the outlet port 13, opening through the bottom wall 11 and the side wall 15 respectively of the ports 9 and 13. Expansion port 16 conventionally merely is a restriction integrally formed or manufactured separately and inserted within the valve body 2 between the inlet and outlet ports 9 and 13. The design of the expansion port 16, the relative dimensions of the inlet and outlet ports and the diameters of the connectors 12 and 17 all may vary in other embodiments of this invention.

The end 6 of the valve body 2 has a cavity 18 formed in it. Cavity 18 extends axially inwardly of the cylindrical section 5 along a centerline axis coincident with the axis of expansion port 16. Cavity 18 is formed by a side 19 and bottom 20. The bottom 20 has a central hub 21 extending axially outwardly from it. The hub 21 has a central opening 22 through it, extending from the cavity 18 to the outlet port 13. The centers of the opening 22 and the expansion port 16 are coincident with one another.

The end 6 of the cylindrical section 5 has an annular flange 23 formed in it outboard of the mouth of cavity 18, which defines a seat 24 for attaching the diaphragm valve assembly 25 to the valve body 2.

Diaphragm valve assembly 25 includes an enclosure 26, a flexible diaphragm 27 and a valve pin 28.

The enclosure 26 is circular in plan and is formed from a first part 29 and a second part 30, joined to one another along their respective radially outer edges in a fluid impervious seal by any convenient method. The enclosure 26 is mounted to the valve body along the seat 24 and, together with the cavity 18, delimits a chamber 32.

The part 30 of enclosure 26 is annular in plan, having a central opening 65 through it, which receives the flange 23 and permits attachment of the valve assembly 25 to the valve body 2. The part 30 includes a relatively flat perimetric lip 33.

First part 29 of enclosure 26 is circular in plan, and includes a relatively flat perimetric lip 34 which is joined to the lip 33 to form the enclosure 26. Prior to the joining of the lips 33 and 34, the diaphragm 27 is positioned so that the lips 33 and 34 engage the diaphragm 27 along the outer peripheral boundary of the diaphragm. As indicated, the joint between the parts 29 and 30 may be accomplished by any convenient method. With the diaphragm 27 and enclosure 26 in place on the valve body 2, the chamber 32 is divided into a first chamber portion 32a and a second chamber portion 32b. The diaphragm 27 is conventional and may be constructed from a variety of materials. In general, it is relatively thin and flexible in response to pressure differentials between the chamber portion 32a and 32b. Enclosure part 29 has an opening 35 in it which receives an end 67 of a tube 36. The tube 36 extends between the chamber portion 32a and a temperature sensor 37. The end 67 of the tube 36 is welded or brazed to the part 29 to provide a closed system between the chamber portions 32a and the sensor 37. The sensor 37 and tube 36 comprise the remote temperature sensing means 4.

The portion 32b of chamber 32 contains a freely movable buffer plate 38. The buffer plate 38 abuts the diaphragm 27 on a first side and an end 39 of the valve pin 28 on a second side of its material thickness. Buffer plate 38 is utilized to prevent damage to the diaphragm 27 as the valve pin 28 moves during valve 1 operation.

Valve pin 28 construction is conventional and includes a cylindrical structure having the first end 39 and a second end 40. Pin 28 is movably mounted in the opening 22, the end 40 extending through the expansion port 16 in all portions of the pin 28.

The end 40 has a stop valve 41 formed in it. Stop valve 41 is intended to block expansion port 16 along a seat defined by bottom 11 of the inlet port 9, and to move axially away from the seat in response to pressure differentials acting on the diaphragm 27.

A spring clip 42 is mounted near the end 39 of the valve pin 28. Clip 42 is conventional and a variety of structures may be used for this function. A biasing spring 43 has a first end 68 and a second end 69. The spring 43 is positioned in the cavity 18 so that the end 68 abuts the clip 42 and the end 69 abuts the bottom 20. The end 69 is mounted over the hub 21. Hub 21 insures that the spring 43 remains centrally located within the cavity 18. While use of the hub 21 is preferred, those skilled in the art will recognize that the hub 21 may be eliminated in other embodiments of this invention. Spring 43 exerts an upward force on the spring clip 42 which force is transmitted, through the valve pin 28 and the buffer plate 38, to the diaphragm 27.

As indicated, the temperature sensor 37 is operatively connected to the chamber portion of the chamber 32 through the tube 36. Sensor 37 is conventional in that it includes an enclosure bulb 44 having both a charged line 46 and the tube 36 connected to it. The bulb 44 generally is packed with some form of ballast. For example, silica gel is a suitable ballast in many applications. Thereafter, the bulb 44 is charged with an inert gas through the charge line 46. The charge gas is absorbed by the ballast. As explained hereinafter, the bulb 44 is charged until a desired pressure is obtained in the system defined by the bulb 44, tube 36, and chamber portion 32a. At that point, the charge line 46 is crimped and sealed and merely becomes a nonfunctional appendage to the valve 1 assembly.

The above described valve 1 structure is preassembled with the charge tube 46 open. As indicated, the diaphragm valve assembly 25 is sealed to the valve body 5 and completely encloses the cavity 18. Consequently, the spring 43 is sealed within the cavity 18, thereby denying access to the spring. This is an important feature of the invention in that factory calibration of the valve 1 operating point cannot be altered by field personnel.

In the assembled condition of the valve 1, but with the bulb 44 being uncharged, spring 43 biases the diaphragm 27 and valve pin 28 upwardly, thereby closing the expansion port 16.

Figure 1:
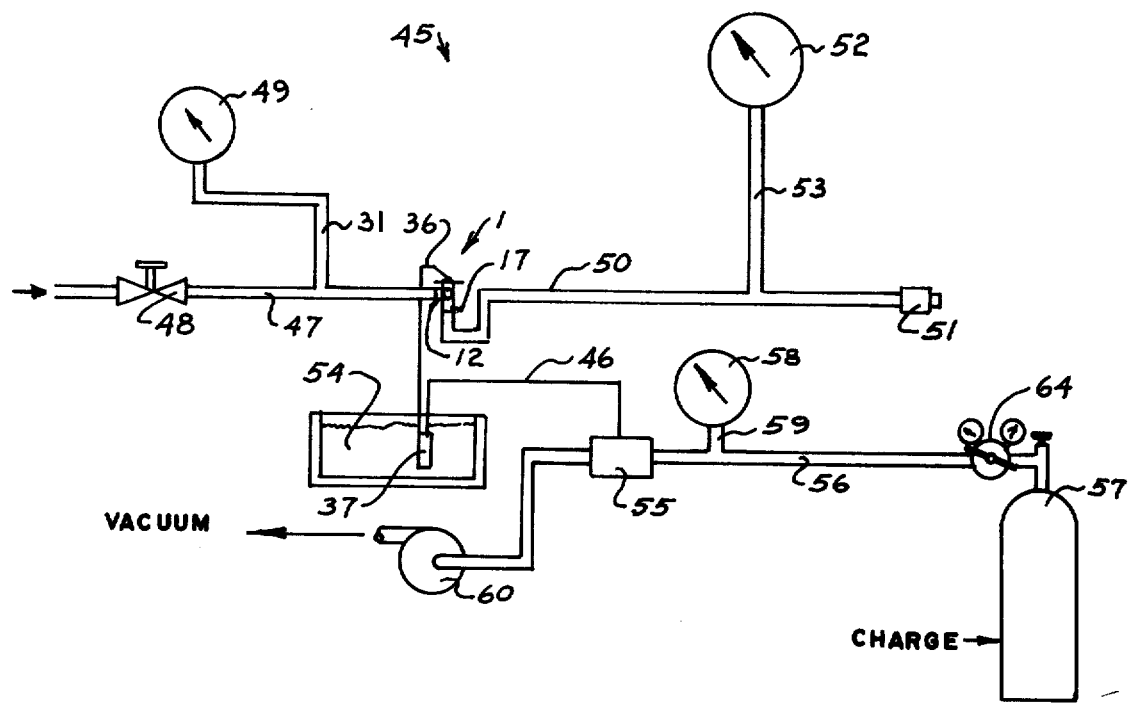
FIG. 1 is a diagrammatic representation illustrating a method for charging a temperature sensor utilized in conjunction with the valve of this invention.

Calibration of the valve is obtained by inserting the valve 1 in a charge system 45, shown in FIG. 1. As there shown, the connector 12 is attached to an inlet air line 47 through an inlet regulator 48. Inlet pressure is monitored by a pressure guage 49, connected to the inlet line 47 through a line 31. The outlet connector 17 of the valve 1 is attached to an outlet air line 50. The line 50 is attached to an orifice 51 which simulates the flow impedance presented by the evaporator of a refrigeration system in which the valve 1 finds application. Outlet pressure is observable at a guage 52 connected to the outlet air line 50 through a line 53.

The sensor 37 is inserted in an ice bath 54, the temperature of which is maintained at 32°F. The charge line 46 is connected to a regulator and crimping device 55 which receives the charging fluid along a line 56 from a charge source 57, through a control 64. Charge pressure is monitored at a guage 58 connected to the line 56 along a line 59. Some fluids useful in charging the sensor 37 require evacuation of the bulb 44, prior to charge insertion. In those situations, a vacuum pump 60 may be connected to the charge line 46 through the regulator 55. The bulb 44 thereafter may be evacuated prior to charge insertion.

To charge the sensor 37, air from a source, not shown, is permitted to enter the inlet side of the valve 1 from the regulator 48. As indicated, without charge pressure, the spring 43 will bias the stop valve 41 to its closed position against the expansion port 16, preventing flow through the valve. Charged pressure in the bulb 44 is raised through the charge line 46 until the pressure in the bulb 44, tube 36, chamber portions 32a system is at least equal to the biasing force of the spring 43. In general, the pressure is raised to permit some predetermined amount of flow through the valve. Flow through the valve is indicated at the outlet pressure guage 52. An operating point can be set merely by raising the charge pressure, observable at the guage 58, until the desired output pressure appears at the guage 52.

In some applications, the pressure drop through the evaporator is sufficiently large so that it becomes a factor in the operation of the valve 1. In those applications it is common to provide a connection line 61 which is connected between the evaporator output side and the chamber portion 39b. In other applications, particularly those where the pressure drop through the evaporator is small, evaporator pressure is not sensed and the connection line 61 may be eliminated. When the valve 1 has the connection line 61 associated with it, the line 61 is connected to outlet air line 50 and a source of equalizer pressure (not shown) may be connected to the line 53 to simulate pressure drop through the evaporator. In either case, the charge pressure is adjusted until the desired outlet pressure is obtained at the guage 52. At that point, the line 46 is crimped, sealing the prescribed charge within the bulb 44, and the valve 1 is removed from the charge system 45.

Use of the valve of this invention is similar to prior art devices in that it is inserted in a refrigeration system and receives high pressure liquid from the system condensor at the inlet port 9. In passing through the expansion port 16, the liquid changes to gas and flows through the evaporator where it absorbs heat. The sensor 37 and the connecting line 61 when used, are connected to the outlet side of the evaporator. Temperature rise in the refrigerant raises the pressure of the gas in the bulb 44 which acts to drive the diaphragm 27 downwardly, as referenced in FIG. 2. Downward movement of the diaphragm 27 opens the stop valve 41 permitting greater flow through the expansion port 16. Conversely, a decrease in temperature sensed by temperature sensor 37 reduces pressure in the chamber portion 32a portion of the chamber 32. The biasing force provided by the spring 43 moves the diaphragm 27 upwardly moving the stop valve 41 toward its closed position and restricting flow through the expansion port 16 of the valve 1.

Numerous variations, within the scope of the appended claims, will be apparent to those skilled in the art in light of the foregoing description and accompanying drawings. For example, the charging system utilized in conjunction with the valve 1 of this invention may be utilized with the valve bodies having means for adjusting the spring 43, if desired. Likewise, various modifications may be made to the valve 1 structure. For example, the structure shown in FIG. 2 utilizes an interference fit between the valve pin 28 and the body 5 in maintaining the sealed arrangement of the chamber 39. Other means for maintaining a seal for the chamber 39 are compatible with the broader aspects of this invention. For example, some form of packing may be utilized with a loose, slip fit between the valve body 5 and the pin 28. While inlet and outlet ports where given in particular locations in the body 5, those skilled in the art will recognize that their relationship may be interchanged, if desired. These variations are merely illustrative.

Having thus described the invention, what is claimed and desired to be secured by Letters Patent is:

1. A thermostatic expansion valve comprising:
   a valve body having an inlet port and an outlet port interconnected by an expansion port, said valve body having a cavity formed in it, said cavity including a bottom wall having an opening in it, said opening being aligned with said expansion port in said valve body;
   a diaphragm actuated valve attached to said body and closing said cavity, said valve including an enclosure having a first section and a second section, said first and said second sections being joined to one another about said cavity to define a chamber therewith, a flexible diaphragm mounted between said first and said second sections along the outer periphery of said diaphragm, said diaphragm dividing said chamber into a first chamber portion and a second chamber portion, a valve pin having first and second ends, said valve pin being mounted in said opening so that said second end extends through said expansion port, said valve pin being operatively connected to said diaphragm and movable in response to said pressure differences between said first and said second chamber portions, a stop valve mounted to the second end of said valve pin and adapted to regulate the opening of said expansion port as said valve pin moves in response to said pressure differences, a spring completely enclosed by said valve body and said diaphragm valve so as to prevent mechanical connections to said spring for adjusting the force exerted by said spring, said spring being positioned in said second chamber portion and biased so as to exert a force on said diaphragm in a direction which tends to close said expansion port, the force of said spring being predetermined and nonadjustable; and
   pressure generating means responsive to temperature operatively connected to the first chamber portion of said chamber, said pressure generating means being charged to a pressure to set the operating point of said valve.

2. The valve of claim 1 wherein said temperature responsive means is precharged to a pressure sufficient to overcome the spring bias exerted on said diaphragm.

3. The valve of claim 2 further characterized by a movable buffer plate interposed between the first end of said valve pin and said diaphragm.

4. The valve of claim 3 further characterized by means for sensing a pressure operatively connected to said second chamber portion of said chamber.

5. In a thermostatic expansion valve including a valve body having an inlet port and an outlet port interconnected by an expansion port, the improvement which comprises a diaphragm valve having a tamper proof operating point mounted to said valve body for controlling fluid passage through said expansion port, said diaphragm valve comprising an enclosure having first and second sections joined to one another to define a chamber with said valve body, a flexible diaphragm dividing said chamber into a first chamber portion and a second chamber portion, the outer perimeter of said diaphragm being engaged by said enclosure between said first and said second sections, a valve pin movably mounted in said valve body on the second chamber portion side of said diaphragm and adapted to regulate the size of said expansion port, said valve pin being movable with said diaphragm in response to pressure changes acting on said diaphragm, a spring mounted in said valve on the second chamber portion side of said diaphragm, said spring being biased to exert a force tending to urge said diaphragm in a first direction, said spring being enclosed by said valve body so as to prevent all access or adjustment to said spring, and a temperature sensing pressure developing means operatively connected to said first chamber portion, said temperature sensing means comprising means for setting the operating point of said valve, said temperature sensing means being charged to a pressure during valve manufacture so as to counter balance said spring force.

6. The improvement of claim 5 further characterized by a buffer plate movably mounted on said second chamber portion side of said diaphragm, said buffer plate being mounted between a first end of said valve pin and said diaphragm.

7. The improvement of claim 6 wherein the second end of said valve pin has a valve stop integrally formed with it, said valve stop being adapted to regulate the size of said expansion port opening.

8. The improvement of claim 7 further characterized by means for sensing pressure operatively connected through said valve body to the second chamber portion side of said diaphragm.

9. The improvement of claim 8 wherein said diaphragm actuated valve is hermetically sealed to said valve body.

10. A nonadjustable, tamper proof expansion valve comprising:
   a valve body having an inlet port and an outlet port interconnected by an expansion port, and an open mouth cavity formed in said valve body, said cavity being axially aligned with said expansion port, a diaphragm actuated valve mounted to said valve body so as to enclose said cavity, said diaphragm valve including an enclosure having a first part and a second part joined to one another, said enclosure defining a chamber with said valve body in their mounted position, a flexible diaphragm mounted between said first and said second parts of said enclosure along the outer periphery of said diaphragm, a valve pin movably mounted with respect to said valve body, said valve pin being positioned to extend through said expansion port and being movable in response to forces acting on opposite sides of said diaphragm between a first position closing said expansion port and at least one open position, a spring mounted in said cavity and biased so as to exert a force tending to move said valve stem towards said closed position, said spring being nonaccessible after construction of said valve;
   temperature sensing means for exerting a pressure on the first chamber portion side of said diaphragm operatively connected to said first chamber portion, said temperature sensing means being precharged to a first pressure; and
   means for sensing a second pressure operatively connected to the second chamber portion of said diaphragm.

11. The valve of claim 10 further characterized by a buffer plate on the second chamber portion side of said diaphragm interposed between said diaphragm and said valve stem.

12. The valve of claim 11 further characterized by a spring stop mounted to said valve pin, said spring being biased between said valve body and said spring stop.

13. The valve of claim 12 wherein said cavity includes a bottom wall having a centrally located hub, said spring being placed over said hub.

* * * * *